United States Patent [19]
Miyaguchi et al.

[11] Patent Number: 5,382,334
[45] Date of Patent: Jan. 17, 1995

[54] PROCESS FOR FORMING POLARIZATION INVERSION LAYER

[75] Inventors: Satoshi Miyaguchi; Atsushi Onoe; Hiroyuki Ota, all of Tsurugashima, Japan

[73] Assignee: Pioneer Electronic Corporation, Tokyo, Japan

[21] Appl. No.: 138,214

[22] Filed: Oct. 20, 1993

[30] Foreign Application Priority Data

Oct. 21, 1992 [JP] Japan .................................. 4-283054
Apr. 21, 1993 [JP] Japan .................................. 5-094543

[51] Int. Cl.6 .................................................. H01L 21/00
[52] U.S. Cl. ................................ 204/130; 204/157.15
[58] Field of Search ............................ 204/130, 157.15

[56] References Cited

U.S. PATENT DOCUMENTS

5,060,191 10/1991 Nagasaki et al. .................... 365/145

Primary Examiner—John Niebling
Assistant Examiner—Arun S. Phasge
Attorney, Agent, or Firm—Foley & Lardner

[57] ABSTRACT

Disclosed is a process for forming a polarization inversion layer which can form a periodic metal pattern on one major surface of a substrate and can easily form a fine periodic domain inversion structure. According to this process for forming polarization inversion layer, before or after the step of forming a three-dimensional waveguide, plural pairs of ground anodes and voltage-applying cathodes are formed at predetermined intervals, each pair sandwiching the three-dimensional waveguide along the extending direction thereof, facing each other, and set apart from each other, on one major surface of the substrate parallel to an axial direction where polarization inversion easily occurs, an electron beam is irradiated to the cathodes with the anodes grounded to thereby form a plurality of polarization inversion layers along the extending direction of the three-dimensional waveguide.

14 Claims, 7 Drawing Sheets

SCANNING DIRECTION OF ELECTRON BEAM SPOT

IRRADIATION POSITION OF ELECTRON BEAM SPOT

FIG.7(B)

IRRADIATION POSITION OF ELECTRON BEAM SPOT

PROCESS FOR FORMING POLARIZATION INVERSION LAYER

BACKGROUND OF THE INVENTION

1. Field of the Invention

The present invention relates to a process for forming a polarization inversion layer on a substrate of ferroelectric crystal.

2. Description of the Related Art

Figure 1:
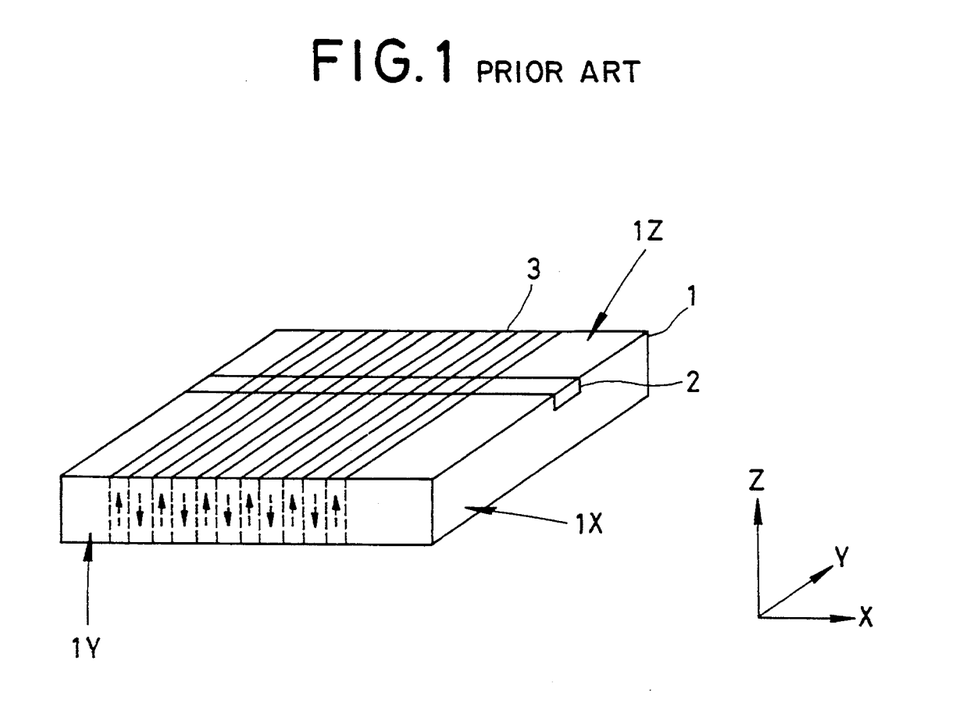
FIG. 1 is a schematic perspective view of a wavelength converting element.

Such a process for forming a polarization inversion layer is used in a method of manufacturing a wavelength converting element, which comprises an elongated core of a ferroelectric substance (three-dimensional waveguide) and a clad of a low refractive index enclosing the core and which causes a basic wave to enter through the waveguide and generates a second harmonics using quasi-phase matching (QPM). As a wavelength converting element which utilizes the second harmonic generation (SHG) and this quasi-phase matching (hereinafter also called QPM-SHG element), the one shown in FIG. 1 is known, which has a plurality of polarization inversion portions 3 (periodic domain inversion structure) that causes the polarization of a three-dimensional waveguide 2 where the basic wave propagates in a substrate 1 of ferroelectric crystal to be periodically inverted along the extending direction of the waveguide. The second harmonics output has such a property that as this output propagates, it periodically reaches the peak and trough levels every coherence length. Quasi-phase matching is a matching method which utilizes this property to alternately invert the sign of a polarization wave that is generated every coherence length, and adds the outputs of the second harmonics to increase the output. As the ferroelectric crystal substrate for the QPM-SHG element, there is used lithium niobate ($LiNbO_3$) crystal or lithium tantalate ($LiTaO_3$) crystal, which has an inversion characteristic (particularly the inversion of $+Z$ face) by which the inversion of 180 degrees of the polarization in the direction of the Z axis of the crystal or the inversion of the polarization domain is likely to occur due to an external factor, such as an impurity, distortion stress, heat, or an electric field, and which also has a high non-linear optical coefficient. As shown in FIG. 1, a Z cut substrate 1 of a $LiNbO_3$ crystal (substrate having, as a major surface, a Z cut face 1Z containing the X—Y axes with the Z axis of the crystal as a normal line) is mainly used as a wavelength converting element. In this diagram, the broken line arrows indicate the direction polarization.

Figure 2:
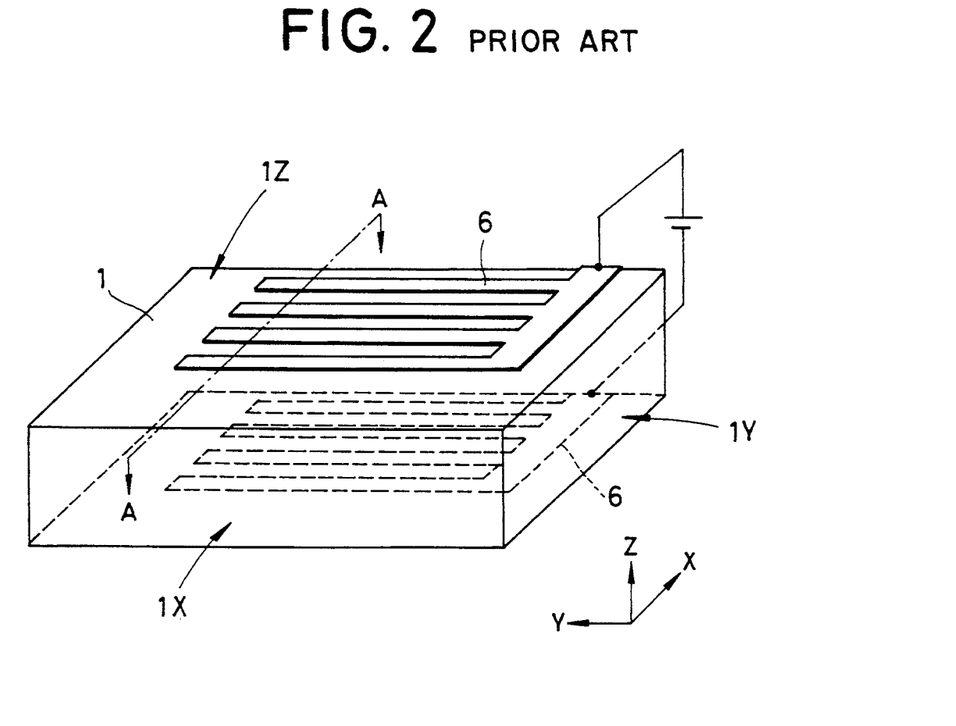
FIG. 2 is a schematic perspective view of a substrate carrying electrodes in the conventional process for forming a periodic domain inversion structure.
Figure 3:
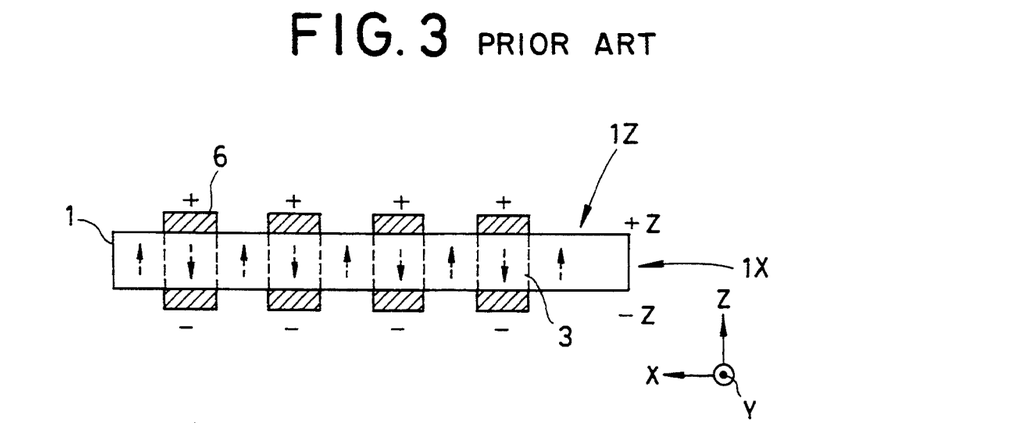
FIG. 3 is an enlarged cross-sectional view taken along the line AA' in FIG. 2.

As a method of forming a periodic domain inversion structure along a three-dimensional waveguide, heat treatment at near the Curie point, electron beam irradiation, application of an electric field, etc. are proposed. For instance, the electron beam irradiation method, disclosed in Japanese Unexamined Patent Publication No. Hei 3-121428, applies a voltage through a fine pattern of electrodes to form polarization inversion portions, as shown in FIG. 2. According to this method, with a Z cut substrate 1 of single domain $LiNbO_3$ in use, both major surfaces, the $\pm Z$ cut faces, are sandwiched by pairs of electrodes 6 of opposite polarities, each pair facing each other, and a voltage of several tens of KV/cm is applied to this substrate 1 through the electrodes 6 at a high temperature of over 1000° C., thus forming a plurality of polarization inversion portions 3, as shown in FIG. 3. The reason for applying a voltage to the Z cut face of the substrate is that the inversion of the polarization domain easily occurs at the Z cut face.

In the heat treatment at near the Curie point, proton exchange is conducted on the major surface of a Z cut substrate of $LiNbO_3$ crystal or $LiTaO_3$ crystal by pyrophosphoric acid, and the resultant structure is subjected to heat treatment at near the Curie point. Proton exchange is performed on the Z cut face of the substrate because the X cut face iX containing the Z—Y axes with the X axis of the crystal as a normal line and the Y cut face 1Y containing the Z-X axes with the Y axis the crystal as a normal line in FIG. 1 are corroded by proton exchange and are thus considered as improper for forming a proton exchange layer. This was reported by Kazuhisa YAMAMOTO, Kiminori MIZUUCHI and Tetsuo TANIUCHI in "Low-Loss Channel Waveguides in $MaO:LiNbO_3$ and $LiTaO_3$ by Pyrophosphoric Acid Proton Exchange" Jpn. J. Appl. Phys. Vol. 31 (1992), pp. 1059-1064 Part 1, No. 4, April 1992.

With a substrate of $LiNbO_3$ crystal or $LiTaO_3$ crystal in use, as described, a three-dimensional waveguide and a periodic domain inversion structure are formed on the Z cut face perpendicular to the Z axis where polarization inversion is easy to occur.

while the electron beam irradiation method of forming a periodic domain inversion structure in which the Z cut faces of the substrate are sandwiched by pairs of electrodes is advantageous in that the refractive indices of the polarization inversion portions do not change, this method requires the application of a high voltage according to the thickness of the substrate. As there is a limit to making the substrate thinner, there is also a limit to forming a fine periodic domain inversion structure.

In the method of performing a heat treatment at near the Curie point to form a periodic domain inversion structure, proton exchange is conducted so that some measures should be taken against the corrosion of the substrate.

SUMMARY OF THE INVENTION

It is therefore an object of the present invention to provide a process for forming a polarization inversion layer which can easily form a fine periodic domain inversion structure.

To achieve the intended object, the present invention provides a process for forming a polarization inversion layer on a substrate of a ferroelectric crystal, comprising the steps of forming plural pairs of ground anodes and voltage-applying cathodes at predetermined intervals, each pair facing each other and spaced apart from each other, on a major surface of the substrate parallel to an axial direction where polarization inversion is easy to occur; and grounding the anodes, irradiating an electron beam to the cathodes to remove the anodes and cathodes, thereby forming a plurality of polarization inversion layers.

According to this invention, it is easy to produce a wavelength converting element having a fine periodic domain inversion structure with a less change in refractive index.

BRIEF DESCRIPTION OF THE DRAWINGS

FIGS. 7 (A) and 7 (B) are plan views of the substrate in the process for forming a polarization inversion layer according to this embodiment;

FIGS. 8 (A) and 8 (B) are schematic perspective views of a substrate, illustrating steps of producing a QPM-SHG element in a process for forming a polarization inversion layer according to another embodiment of the present invention;

DETAILED DESCRIPTION OF THE PREFERRED EMBODIMENTS

Embodiments of the present invention will now be described referring to the accompanying drawings.

Figure 4A:
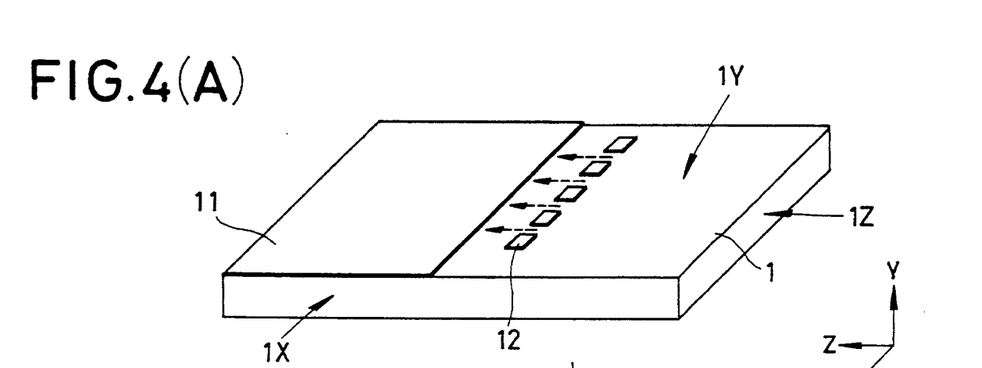
FIGS. 4(A) through 4(D) are schematic perspective views of a substrate, illustrating steps of producing a QPM-SHG element in a process for forming a polarization inversion layer according to one embodiment of the present invention.

First, as shown in FIG. 4(A), using a Y cut substrate 1 of $LiTaO_3$ crystal, plural pairs of ground anodes 11 and voltage-applying cathodes 12 are formed at predetermined intervals, each pair of the anode 11 and cathode 12 facing each other and spaced apart from each other, on a Y cut face 1Y, a major surface, of the substrate parallel to the direction of the Z axis where polarization inversion is easy to occur. Those electrodes may be formed of chromium (Cr), aluminum (Al), gold (Au), silver (Ag) or the like by photolithography, reactive ion etching, or the like.

The anodes 11 are formed as a single metal film to be grounded. The cathodes 12 are formed as a plurality of island-shaped metal films separated at predetermined intervals (X and Z directions). It is desirable that the interval between one pair of the anode 11 and cathode 12 be wider than the width of a waveguide that extends in the X direction, which will be prepared later. In the case where a primary QPM-SHG element having a waveguide that extends in the X direction is produced using a basic wave with a wavelength of $\lambda = 860$ nm, the cathodes 12 are formed at line and space of 1.8 $\mu$m (3.6 $\mu$m pitch) along the X direction. Incidentally, in the case of the third-order QPM-SHG element, the line and space is 5.4 $\mu$m.

Figure 4B:
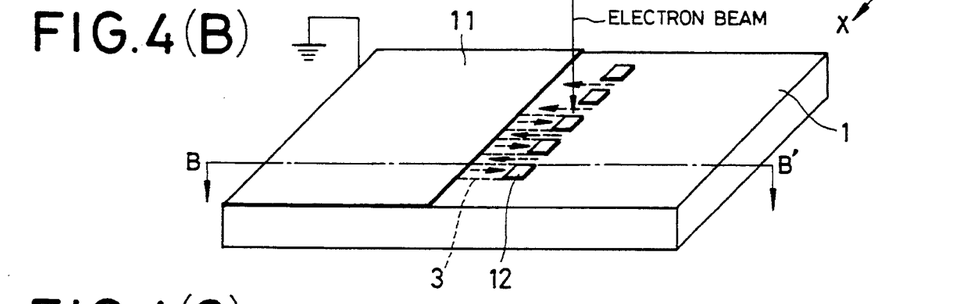
Figure 6:
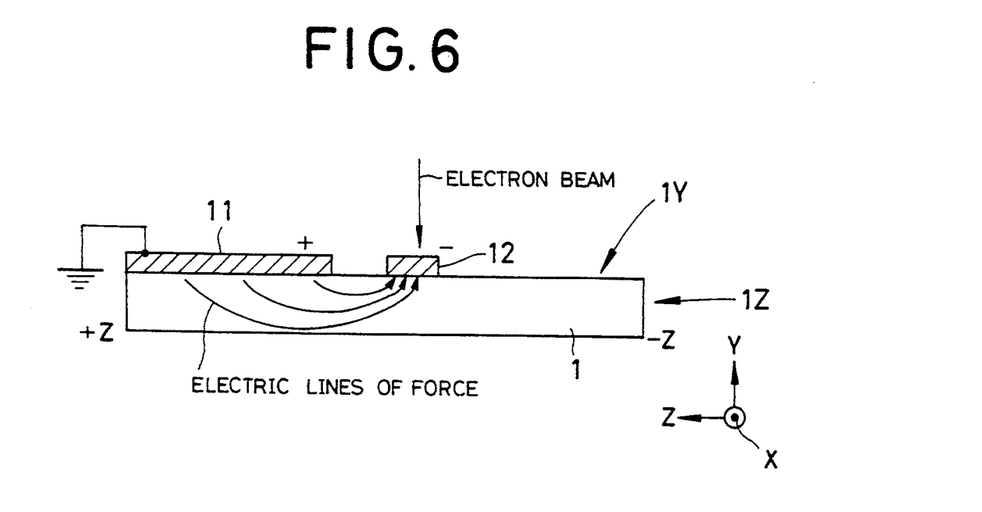
FIG. 6 is an enlarged cross-sectional view taken along the line BB' in FIG. 4 (B)

Next, an electron beam is intermittently irradiated on the cathodes 12, once for each cathode, using an electron beam drawing device as shown in FIG. 4(B). At this time, charges are evenly accumulated directly under the cathodes 12 and an electric field is produced in the substrate 1 between each cathode 12 and the associated anode 11, forming a polarization inversion layer in the Z direction, as shown in FIG. 6. The broken line arrows in FIG. 4(B) indicate the direction of polarization. The electron beam is irradiated at a probe (beam) current Ip of $5 \times 10^{-8}$ A for a dose time of 360 $\mu$sec ($1.8 \times 10^{-11}$[C]) for each cathode 12. The facing edge portions of the anodes 11 and cathodes 12 are formed in parallel to a waveguide, which is formed later and extends in the X direction.

Figure 7A:
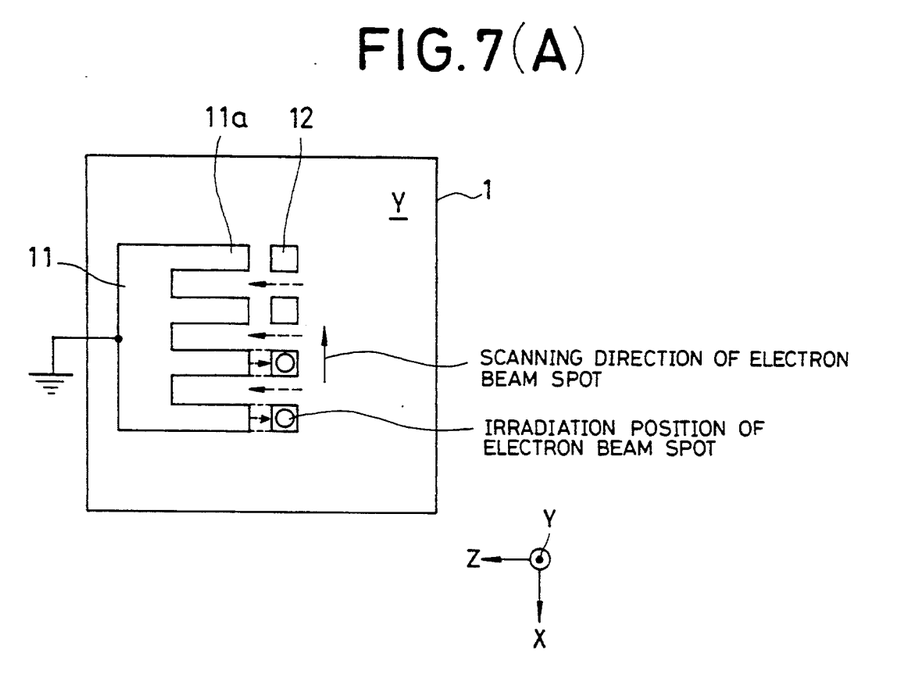
Figure 7B:
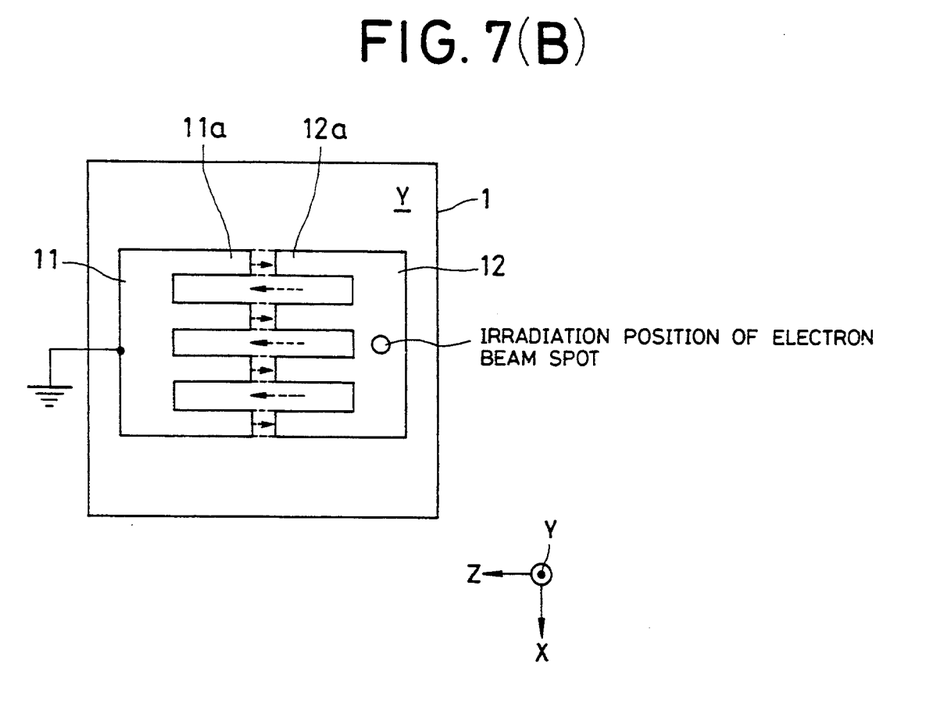

Both electrodes 11 and 12 may be formed in a pattern that has a plurality of island-shaped cathodes 12 arranged side by side in the X direction and a comb-shaped anode 11 having a plurality of teeth 11a at the edge extending in parallel in the Z direction and respectively facing the island-shaped cathodes 12, as shown in FIG. 7(A). The electrode pattern may have both electrodes 11 and 12 formed of comb-shaped metal films having teeth 11a and teeth 12a in such a way that the free end portions of the teeth 11a respectively face those of the teeth 12a, as shown in FIG. 7(B). Each pair of the anode 11 and cathode 12 are formed in such a way that the periodical polarization inversion portions will have a parallel array pattern with a pitch and a width which respectively correspond to the desired pitch and the polarization inversion width, so that when an electron beam is irradiated, the electric flux density becomes greater to ensure efficient polarization inversion.

With the pattern shown in FIG. 7(A), an electron beam may be irradiated continuously in a line on the cathodes 12. In this case, the electron beam is irradiated at the probe (beam) current Ip of $5 \times 10^{-8}$ A at a line scanning speed v of 0.01 $\mu$m/$\mu$sec. Although an electron beam is irradiated on the substrate 1 between the cathodes 12, there is not much influence on the substrate 1 due to the presence of the voltage-applying electrode metal in the vicinity. With the pattern shown in FIG. 7(B), an electron beam is irradiated once on the cathode 12, so that the number of steps required can be reduced. In the method of collectively applying an electric field as shown in FIG. 7(B), uneven application of an electric field may locally occur due to a variation in conductivity which is originated from some smudges on the surface of the substrate crystal, the defect or dislocation of the crystal, or the like. If an electron beam is irradiated individually on the island-shaped cathodes 12 in an intermittent manner or a continuous scanning manner as shown in FIG. 7(A), polarization is inverted only between each pair of the ground and voltage-applying electrodes facing each other, preventing the uneven application of an electric field.

By independently inverting the polarizations of the polarization inversion layers, the polarization inversion layers can be formed without being affected by unevenness of the substrate crystal and can have a highly accurate pitch and duty ratio. Even if the cathodes 12 are set apart from the associated anodes 11 by some distances (50 to 100 $\mu$m), the adjoining polarization inversion portions will not overlap each other. If the cathode and the associated anode are set apart by some distance, the polarization inversion layer becomes deeper, thus improving the characteristic of the QPM-SHG element.

Figure 4C:
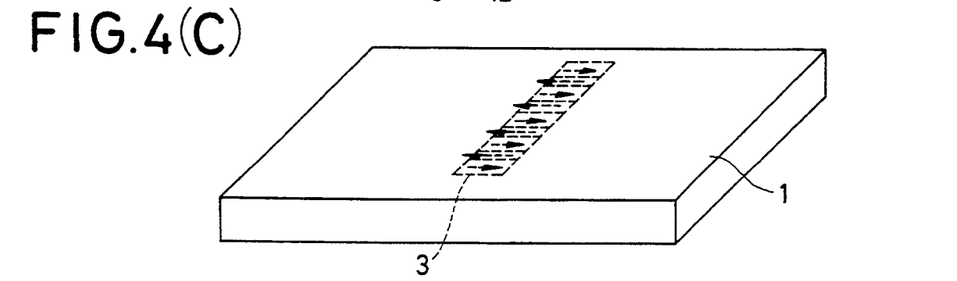

Next, the cathodes 12 and anodes 11 are removed by wet etching, thus forming a plurality of polarization inversion layers 3 arranged linearly as shown in FIG. 4(C). The irradiation of an electron beam on the electrodes formed on the Y cut face of the $LiTaO_3$ crystal can form polarization inversion layers at a low temperature, thus reducing the damages on the crystal.

Figure 4D:
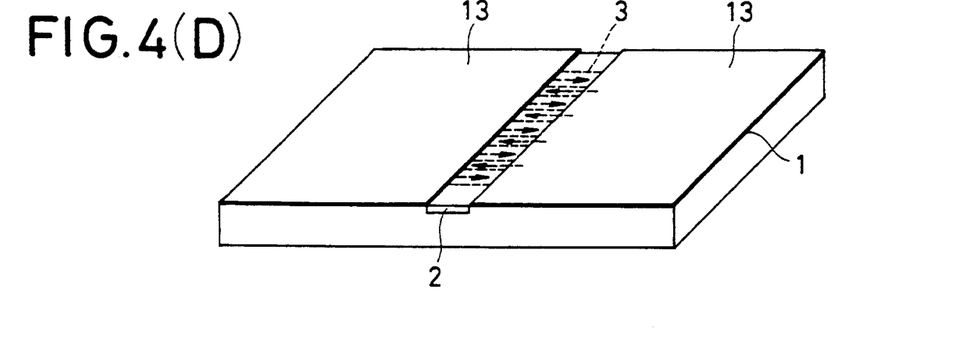

Then, a three-dimensional waveguide is prepared as shown in FIG. 4(D). A tantalum (Ta) film 13, which has a slit 4 $\mu$m wide, and is perpendicular to the polarization inversion layers of a predetermined period, is formed on the Y cut face of the substrate 1 by photolithography, reactive ion etching or the like. The lengthwise direction of the slit matches with the X direction.

Then, this substrate 1 is subjected to proton exchange in a pyrophosphoric acid at a temperature of 260° C. for 30 minutes, forming a three-dimensional waveguide 2. Then, the resultant structure is annealed under the atmosphere of $O_2$ at a temperature of 340° C. for 30 minutes to stabilize the three-dimensional waveguide 2 of the proton exchange layer.

Incidentally, while proton exchange was conducted by pyrophosphoric acid, another proton exchange source, such as benzoic acid, may also be used. The mask may be made of any material so long as it can withstand proton exchange involving pyrophosphoric acid such as gold (Au), platinum (Pt), as well as tantalum (Ta). With the use of benzoic acid in proton exchange, aluminum (Al), chromium (Cr) and titanium (Ti) can also be used. If an annealing step for about 30 minutes at 340° C. is additionally carried out after proton exchange, the loss can be reduced.

Figure 5:
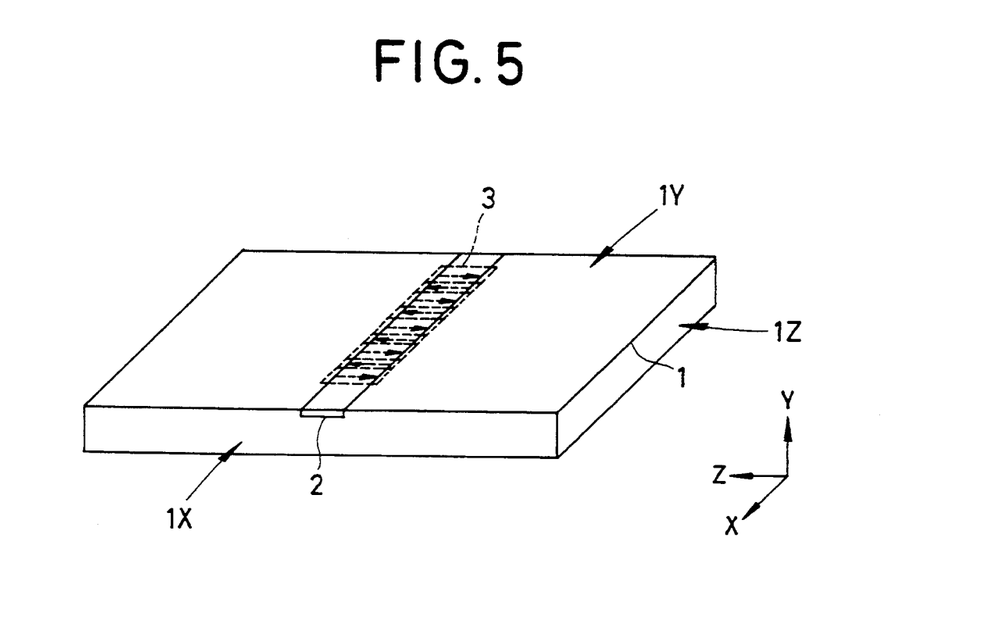
FIG. 5 is a schematic perspective view of the QPM-SHG element acquired by the process for forming a polarization inversion layer according to this embodiment.

Then, the Ta film 13 is removed by wet etching, yielding a wavelength converting element as shown in FIG. 5. Both end faces of the waveguide 2 of this wavelength converting element are polished optically. As the basic wave in TE mode enters the waveguide 2, light of the second harmonics (SHG) can be acquired from the opposite end face. The QPM-SHG element having the three-dimensional waveguide 2 and polarization inversion portions 3 formed on the substrate 1 converts the basic wave (wavelength=$\lambda$, frequency=$\omega$), entering the waveguide 2, into the second harmonics (wavelength=$\lambda/2$, frequency=$2\omega$).

In this embodiment, the three-dimensional waveguide and periodic domain inversion structure are formed on the Y cut face of the Y cut substrate of lithium tantalate crystal for the following reason. The present inventor performed experiments on the corrosion on the XY cut face and Z cut face of $LiTaO_3$ crystal, obtained an average corrosion ratio of the proton exchange waveguide with respect to the slit width on the Y cut face, and found that when the slit width exceeds 0 $\mu$m, is equal to or greater than the width of corrosion-oriented cracks, and is equal to or less than 10 $\mu$m, no corrosion occurs which is very desirable. Even with the use of the X cut substrate of lithium tantalate crystal as another example under the same conditions of the X cut substrate, the above-described method using a slit mask with a slit width of 10 $\mu$m or less can ensure proton exchange with the same corrosion reducing effect. Further, the same advantages are obtained for the X cut or Y cut substrate of lithium niobate crystal. The substrate may be the X cut substrate of lithium tantalate crystal as well as the X cut or Y cut substrate of lithium niobate crystal.

Incidentally, the three-dimensional waveguide is formed after the periodic domain inversion structure is formed, yielding the QPM-SHG element, in the above-described embodiment, but the three-dimensional waveguide may be prepared by proton exchange before forming the electrodes and the polarization inversion portions by the application of an electric field. More specifically, a pattern mask having a slit with such a width as to prevent corrosion from occurring by the proton exchange source is formed on the major surface of the substrate crystal in parallel to the axial direction where polarization inversion easily occurs. Next proton exchange is conducted with the proton exchange source contacting the major surface through the slit, forming a three-dimensional waveguide, then a pair of electrodes (or comb-shaped electrodes each having a plurality teeth which extend perpendicular to the extending direction of the three-dimensional waveguide and are spaced apart from one another) which face each other at some distance with the three-dimensional waveguide in between are formed, then with one of the electrode grounded, an electron beam is irradiated on the other comb-shaped electrode to apply an electric field between the electrodes, forming a plurality of polarization inversion layers along the extending direction of the three-dimensional waveguide. Accordingly, it is apparent that a QPM-SHG element can be produced.

In the above-described embodiment, the cathode 12 is set apart from the anode 11 and electric lines of force are generated inside the substrate, forming deep the polarization inversion layers 3 as shown in FIG. 6. According to another embodiment, to make the polarization inversion layers 3 deeper to improve the characteristic of the QPM-SHG element, the cathode 12 and anode 11 are formed in such a way that parts of both electrodes sandwich the substrate surface portion which is to become a waveguide.

The second embodiment will be described more specifically below.

Figure 8A:
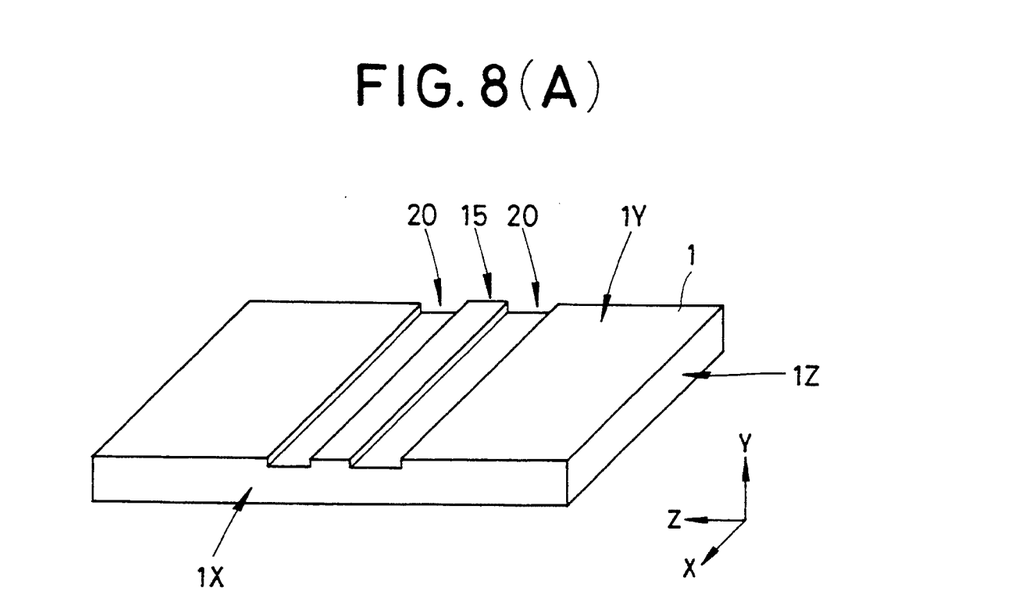

First, as shown in FIG. 8(A), with the Y cut substrate 1 of lithium tantalate crystal prepared, two parallel grooves 20 each several $\mu$m deep are formed on the Y cut face 1Y by dry etching, such as plasma etching or reactive etching, so that the grooves 20 sandwich a substrate surface portion 15 which is to become a waveguide later. Here, anisotropic etching is conducted so that the opposite side walls of each of the parallel grooves 20 sandwiching the substrate surface portion 15 become parallel to each other. Alternatively, several microns may be mechanically cut out and polished, or conversely the substrate surface portion 15 which is to become the waveguide may be epitaxially grown.

Figure 8B:
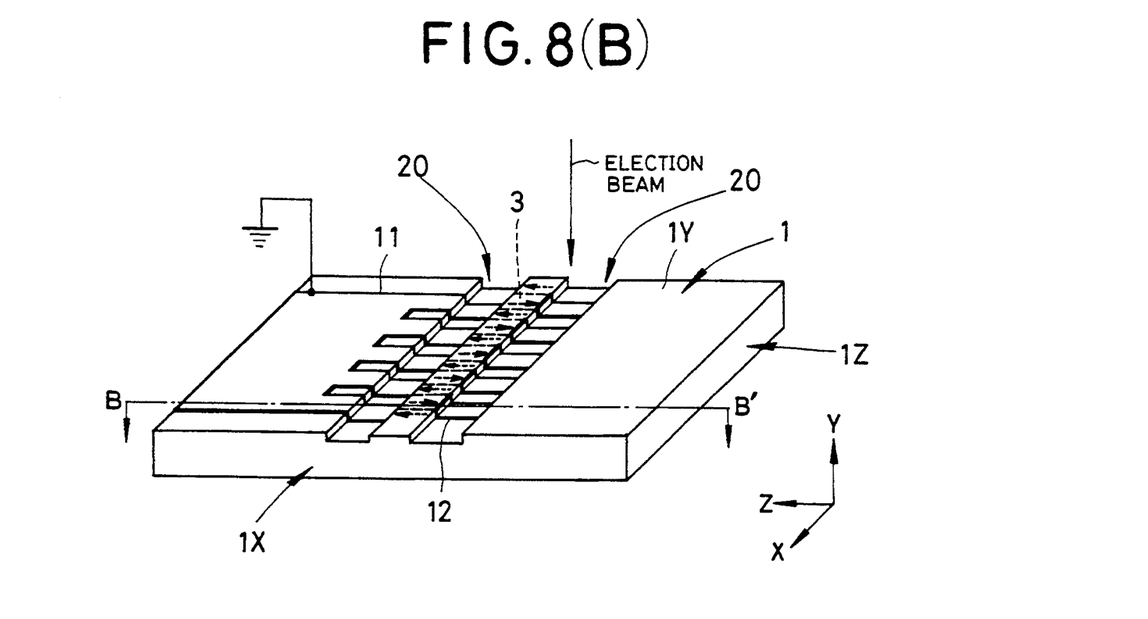

Next, as shown in FIG. 8(B), a plurality of island-shaped cathodes 12 are formed side by side in the X direction in one of the parallel grooves 20, and an anode 11 having a plurality of teeth facing the associated cathodes 12 and extending in the Z direction is formed in the other groove 20. Both electrodes may have a pattern as shown in FIG. 7(B) or FIG. 4(A). The teeth of the cathodes 12 and the anode 11 are formed at predetermined intervals by photolithography or the like, stretching to the opposite side walls (rising portions 11a and 12a in FIG. 9) of the grooves, so that those electrodes sandwich the substrate surface portion 15.

Figure 9:
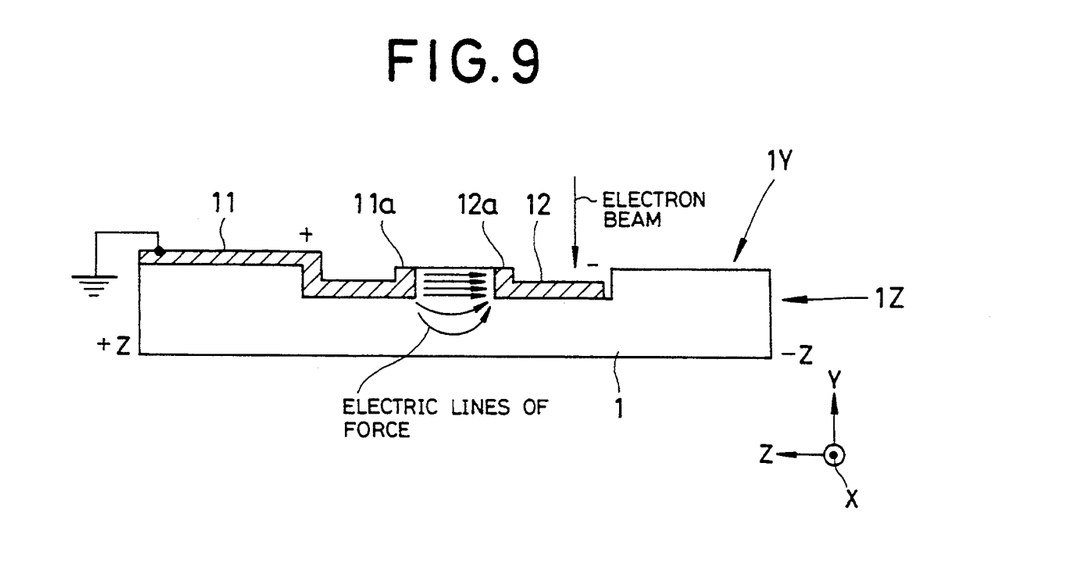
FIG. 9 is an enlarged cross-sectional view taken along the line BB' in FIG. 8 (B)

Then, an electron beam is intermittently irradiated on the cathodes 12, once for each cathode, using an electron beam drawing device as shown in FIGS. 8(B) and 9. As shown in FIG. 9, as the rising portions 11a and 12a of the anode 11 and cathodes 12 are formed on the opposite side walls of the parallel grooves 20, electric charges are evenly accumulated on the vertical surface of the rising portion 12a of the cathodes 12 and an electric field is produced under the substrate surface portion 15 between the rising portion 12a and the rising portion 11a of the anode 11, yielding the polarization inversion layers in the Z direction. By setting the depth of the parallel grooves 20 to the desired value and forming periodical and opposing electrodes on the side walls of the grooves 20, therefore, the QPM-SHG element with a three-dimensional waveguide can be prepared. In the case of the pattern of FIG. 8 (B), an electron beam may be continuously irradiated in a line on a plurality of cathodes 12.

Figure 10:
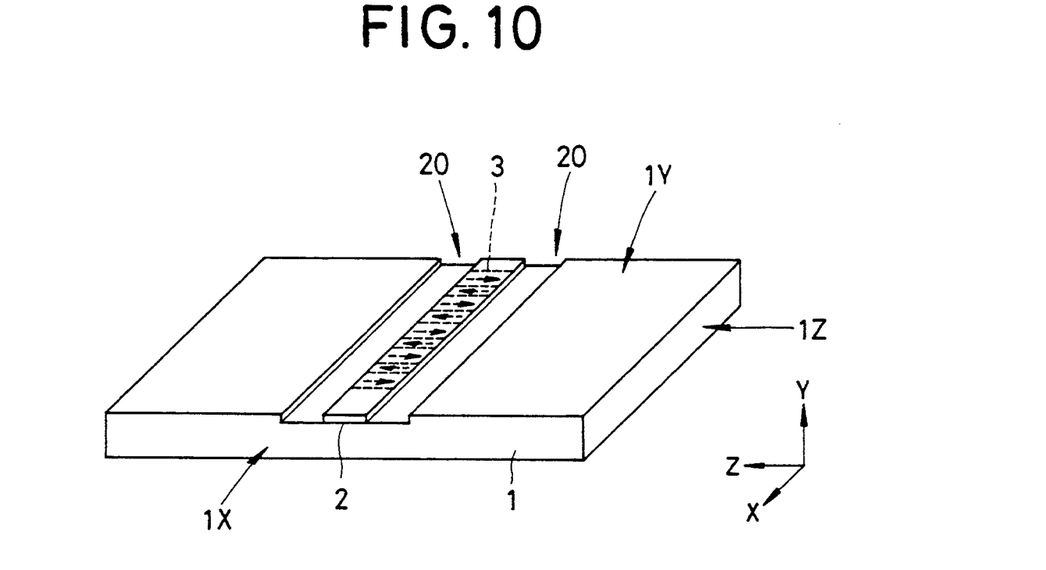
FIG. 10 is a schematic perspective view of the QPM-SHG element acquired by the process for forming a polarization inversion layer according to this embodiment.

Thereafter, the same steps as shown in FIGS. 4(C) and 4(D) will be performed and both end faces of the waveguide 2 are optically polished, yielding a wavelength converting element as shown in FIG. 10.

As described above, according to the polarization inversion layer forming method of this invention, before or after the step of forming a three-dimensional waveguide by proton exchange or the like, plural pairs of ground anodes and voltage-applying cathodes are formed at predetermined intervals, each pair sandwiching the three-dimensional waveguide along the extending direction thereof, facing each other, and set apart from each other, on one major surface of the substrate parallel to an axial direction where polarization inversion easily occurs, an electron beam is irradiated to the cathodes with the anodes grounded to thereby form a plurality of polarization inversion layers along the extending direction of the three-dimensional waveguide. In the case of a QPM-SHG element with the primary quasi-phase matching, the distance between the electrodes is as small as several $\mu$m, so that the desired electric field can be obtained at a low voltage and polarization inversion can be accomplished at such a voltage. Further, a periodic metal pattern can be formed on one major surface of the substrate to simplify the steps of producing a QPM-SHG element and easily form a fine periodic domain inversion structure. Furthermore, if a Ta mask with a slit having a width of 10 $\mu$m or narrower is formed on the X cut face or Y cut face of the X cut or Y cut substrate of lithium tantalate crystal or lithium niobate crystal, i.e., the major surface parallel to the axial direction where polarization inversion easily occurs, and the resultant structure is subjected to proton exchange, it is possible to produce a channel proton exchange layer which can be used as a waveguide. If the lengthwise direction of the slit is set perpendicular to the Z axis, the channel proton exchange layer can be used as a three-dimensional waveguide suitable to block light in TE mode.

What is claimed is:

1. A process for forming a polarization inversion layer on a substrate of ferroelectric crystal, comprising the steps of:
    forming plural pairs of ground anodes and voltage-applying cathodes at predetermined intervals, each pair facing each other and set apart from each other, on a major surface of said substrate parallel to an axial direction where polarization inversion easily occurs;
    grounding said anodes;
    irradiating an electron beam to said cathodes; and
    removing said anodes and cathodes, thereby forming a plurality of polarization inversion layers.

2. The process according to claim 1, wherein said cathodes are a plurality of island-shaped metal films arranged side by side in a predetermined direction, said anodes are a comb-shaped metal film having a plurality of teeth respectively facing said island-shaped metal films, and an electron beam is irradiated on said island-shaped metal films in a line or intermittently.

3. A process for forming a polarization inversion layer on a ferroelectric crystal substrate, said process comprising the steps of:
    forming a plurality of anode regions on a main surface of said substrate, and a plurality of cathode regions on said main surface of said substrate, each of said cathode regions corresponding to one of said anode regions to form a plurality of pairs of anodes and cathodes, each of said pairs being formed apart from each other and facing each other;
    grounding said anode regions; and
    irradiating said cathodes with an electron beam such that a plurality of polarization inversion layers are formed.

4. A process as recited in claim 3, wherein said anode regions comprise teeth of a comb-shaped metal film formed on said main surface of said substrate.

5. A process as recited in claim 4, wherein each of said cathode regions is a discrete metal film region formed on said main surface of said substrate.

6. A process as recited in claim 4, wherein said cathode regions comprise teeth of a comb-shaped metal film formed on said main surface of said substrate.

7. A process according to claim 3, wherein said forming step comprises the steps of:
    forming a first and second groove in said main surface of said substrate, said first and second groove being parallel to each other; and
    forming said anode regions in said first groove and forming said cathode regions in said second groove.

8. A process according to claim 3, wherein each of said cathode regions is a discrete metal film region formed on said main surface of said substrate.

9. A process according to claim 8, wherein said irradiating step comprises the steps of intermittently activating said electron beam at a point corresponding to each of said discrete metal film regions.

10. A process according to claim 8, wherein said irradiating step comprises the steps of activating said electron beam in a line extending through each of said discrete metal film regions to irradiate each of said cathode regions.

11. A process according to claim 3, wherein said substrate comprises a LiTaO$_3$ crystal substrate.

12. A process according to claim 11, wherein said main surface of said substrate is an X or Y cut face parallel to the axial direction where polarization inversion easily occurs in said LiTaO$_3$ crystal substrate.

13. A process according to claim 3, wherein said substrate comprises a LiNbO$_3$ crystal substrate.

14. A process according to claim 13, wherein said main surface of said substrate is an X or Y cut face parallel to the axial direction where polarization inversion easily occurs in said LiNbO$_3$ crystal substrate.

* * * * *